April 11, 1939. E. S. ROSCOE Re. 21,048

APPARATUS FOR SORTING PAPERS, CARDS, AND THE LIKE

Original Filed May 28, 1932 4 Sheets-Sheet 1

INVENTOR
Edwin S. Roscoe
BY D. Clyde Jones
ATTORNEY

APPARATUS FOR SORTING PAPERS, CARDS, AND THE LIKE

Original Filed May 28, 1932 4 Sheets-Sheet 2

Fig. 6-a

INVENTOR
Edwin S. Roscoe
BY D. Clyde Jones
ATTORNEY

APPARATUS FOR SORTING PAPERS, CARDS, AND THE LIKE
Original Filed May 28, 1932 4 Sheets-Sheet 3
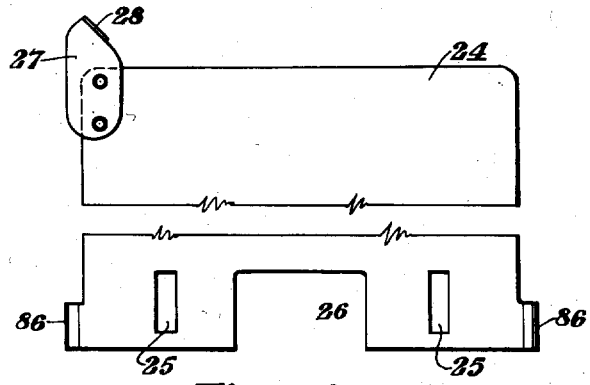
Fig. 10
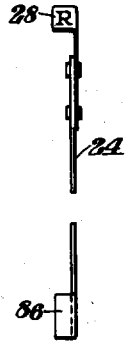
Fig. 11
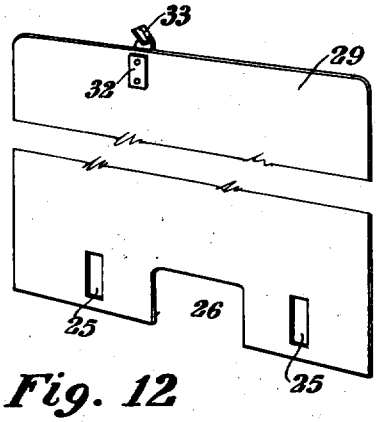
Fig. 12
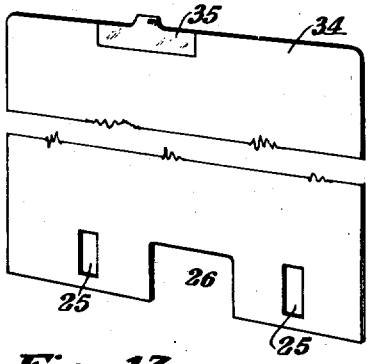
Fig. 13
Fig. 14
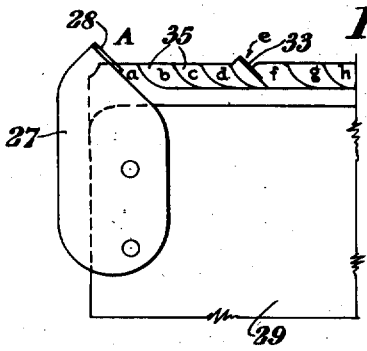
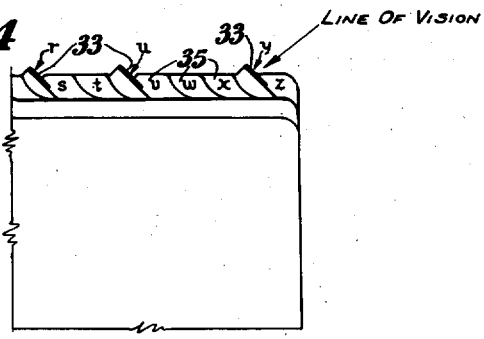
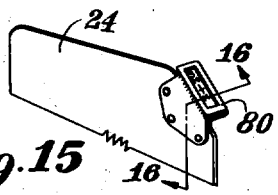
Fig. 15
Fig. 16
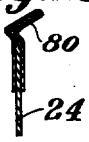
INVENTOR
Edwin S. Roscoe
BY D. Clyde Jones
ATTORNEY

APPARATUS FOR SORTING PAPERS, CARDS, AND THE LIKE

Original Filed May 28, 1932 4 Sheets-Sheet 4

INVENTOR
Edwin S. Roscoe
BY D. Clyde Jones
ATTORNEY

Reissued Apr. 11, 1939

Re. 21,048

UNITED STATES PATENT OFFICE 21,048

APPARATUS FOR SORTING PAPERS, CARDS, AND THE LIKE

Edwin S. Roscoe, Rochester, N. Y., assignor to Yawman & Erbe Mfg. Co., Rochester, N. Y., a corporation of New York Original No. 2,055,364, dated September 22, 1936, Serial No. 614,180, May 28, 1932. Application for reissue October 23, 1937, Serial No. 170,679

18 Claims. (Cl. 129—16)

Figure 1:
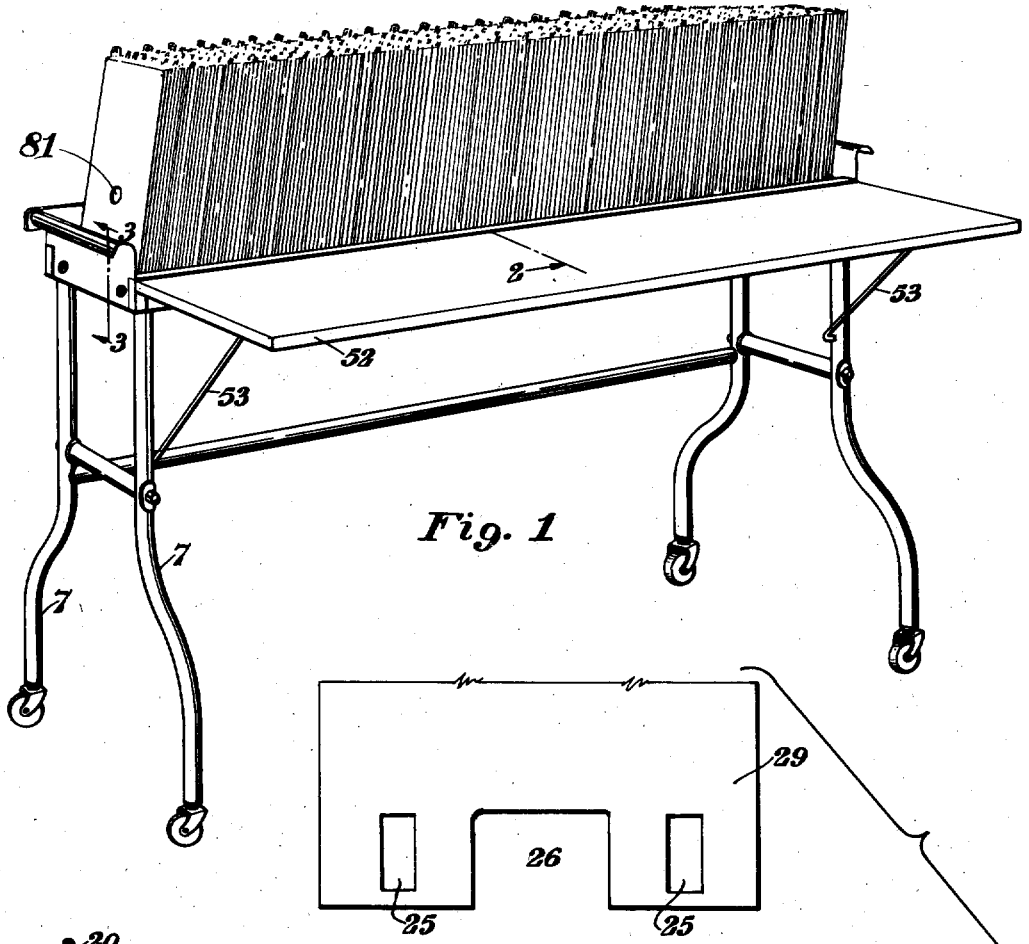

This invention relates to a method of and apparatus for sorting papers, cards and the like.

In the handling of various papers and cards, it is frequently necessary to arrange them in alphabetical or numerical order, or according to some other desired sequence. The simplest hand method of sorting material has usually involved the steps of first arranging it into groups according to the first designating letter or numeral; then subdividing each of these subgroups according to the second letter or numeral, and thereafter continuing the sorting steps according to other letters or numerals until all of the material is finally arranged in the desired sequence. Of course, these detailed steps are often abbreviated when small quantities are involved, but they are typical of the amount of handling of material involved in various sorting operations. With the quantities of material usually encountered in the routine of large offices, the aforementioned hand method of sorting requires a large amount of table space; it exposes the piles of grouped papers to the unrestrained disturbance by draughts and passers-by; and it increases the number of handlings because the number of groups practicable for each sort is limited by the work table space.

In accordance with the present invention a novel method of sorting is proposed and relatively inexpensive apparatus is provided which reduces the space previously required for prior sorting equipment of a given capacity, and which lessens the number of necessary handlings while permitting the maximum of sorting speed obtainable in a manual device.

The main feature of the present invention therefore, relates to a method of sorting papers or cards into groups and subgroups arranged in a row, wherein the subgroup selection is effected on a coordinate basis, that is, the group is selected along one axis of the row and the subgroup thereof is selected along an axis at an angle to the first axis by an operator facing the edges of the sorted papers or cards. This method permits an operator facing a large number of sorting leaves or guides defining the groups and subgroups to manipulate them from an intermediate point along the long axis of the row of guides, thereby increasing the number of possible groups within reach of the operator. As distinguished from applicant's novel method, it has been customary in accordance with former methods for the operator to face the surface of the guides as in ordinary filing devices with the consequent restriction of the number of groups within reach of the operator.

A further feature of the invention consists in the combination of primary and secondary indexing tabs for the respective guides in which the primary tabs carry letters, numbers, or other designating characters plainly legible to the operator with the line of vision lying substantially in the plane of the guide and in which the secondary tabs either labelled or unlabelled, but differently oriented with respect to the primary tabs, indicate guides lying between the guides of said primary tabs, so that the sorting operator identifies them by their location with relation to the nearest primary tabs. For economy of space, it is proposed not to make the faces of said secondary tabs plainly visible from the edges of the guides, but they may have labelled surfaces visible from the face of the respective guides to assist in the manufacturing assembly of such guides and to aid inexperienced operators in identifying them.

An additional feature of the invention consists of the mechanical construction of the guides and their suspension by which the guides are normally supported at a comparatively uniform inclined position thereby maintaining legibility of the indexing system while still permitting them to be readily opened for the insertion of sorted papers, and by which they have unlimited adjustment within the confines of the sorting tray permitting the filling of the sorter to its full capacity irrespective of the relative distribution of sorted material. These guides when released resume their normal inclined position to rest back against the papers or cards inclosed by them so that said papers or cards cannot be displaced by draughts or passers-by.

Figure 2:
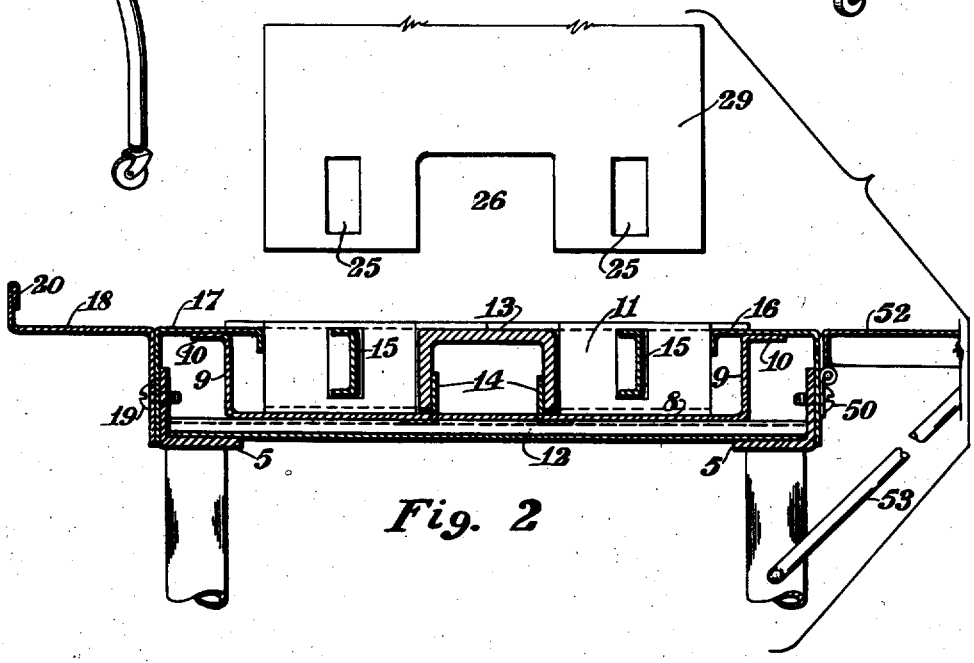
Figure 3:
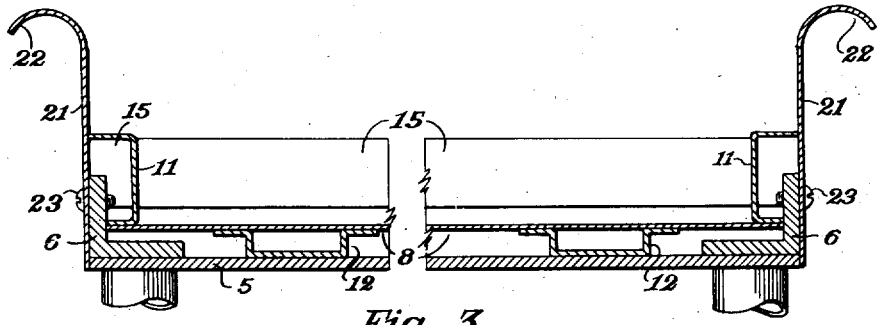
Figure 4:
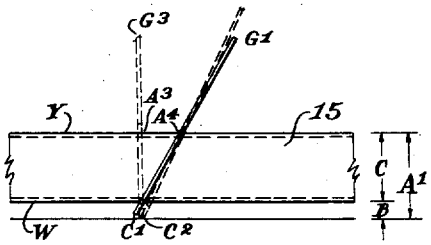
Figure 5:
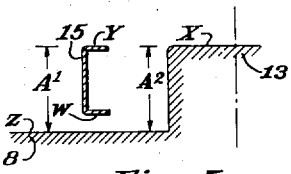
Figure 6:
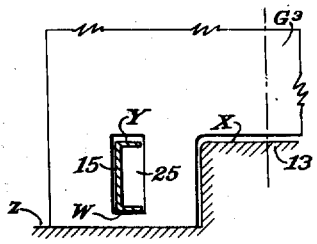
Figure 7:
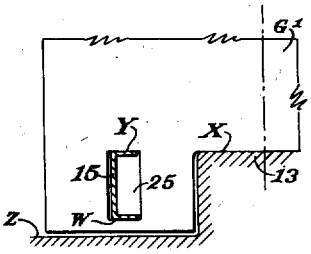
Figure 7:
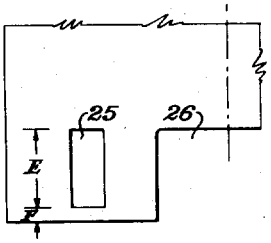
Figure 8:
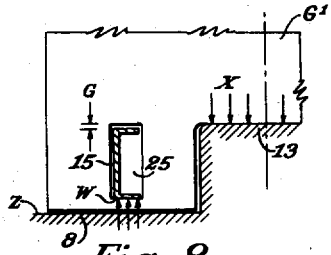
Figure 9:
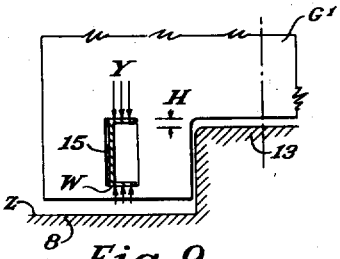
Figure 17:
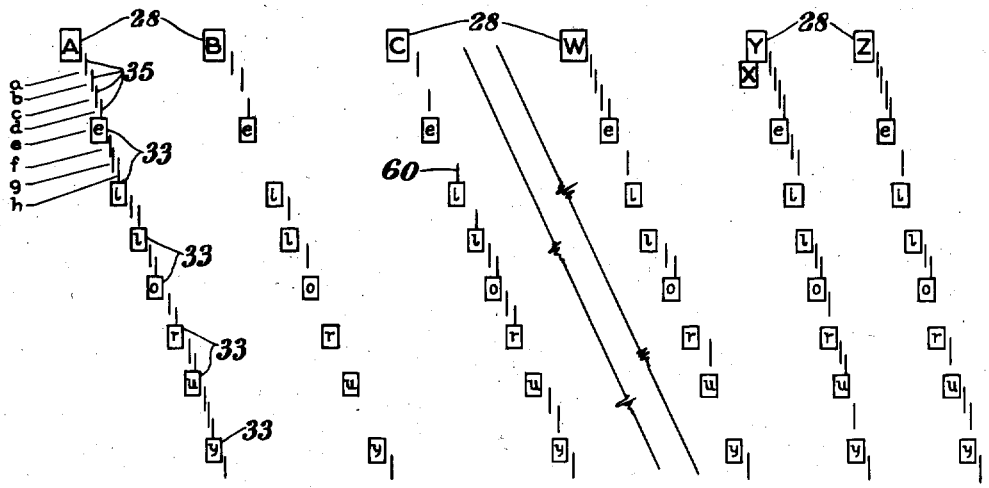
Figure 18:
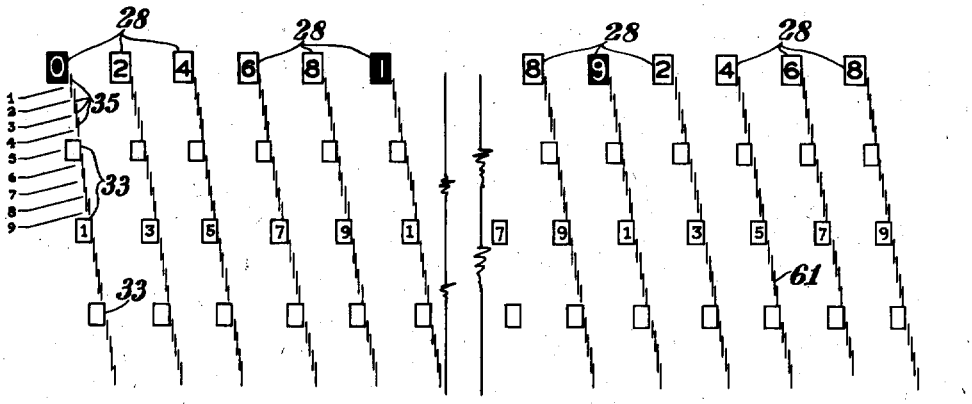
Figure 19:
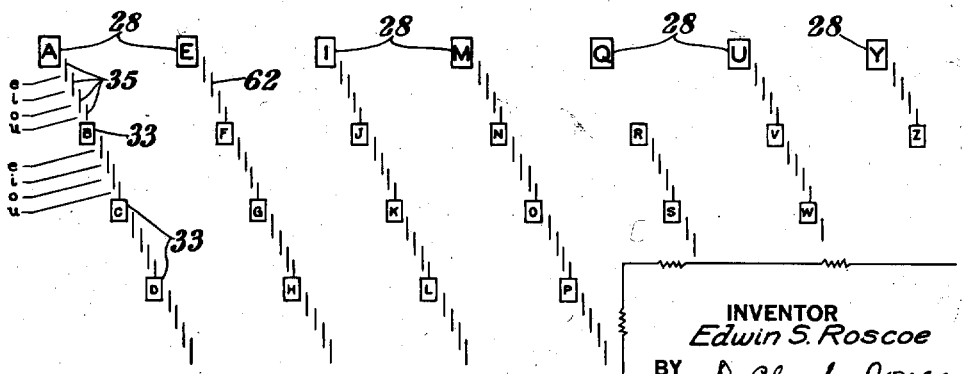

These and other features of the invention will appear from the detailed description and claims when taken with the drawings in which Fig. 1 is a perspective view of the improved sorter of the present invention; Fig. 2 is a cross-section of a portion of the sorter taken substantially on the line 2—2 of Fig. 1 and showing a portion of a guide removed from the same; Fig. 3 is a vertical section of a portion of the sorter of Fig. 1 taken along the long axis thereof substantially on the line 3—3 of Fig. 1; Fig. 4 is a side elevation of a portion of the guide rod with a single guide thereon in a position of rest; Fig. 5 is a cross section of the guide rod, the bottom of the tray and the guide rest being shown diagrammatically; Fig. 6 is a view similar to Fig. 5 with the guide shown in an upright position; Fig. 6*a* is a similar view with a guide in a fully inclined position of rest; Fig. 7 is a fragment of the lower corner of a guide showing certain of its more important dimensions; Fig. 8 is a view as in Fig. 4 showing a guide rod in a presumably depressed position and showing a guide thereon in an inclined position; Fig. 9 is a view similar to Fig. 8 with the guide rod in a presumably raised position; Figs. 10 and 11 represent respectively, a front elevation and a side elevation of a fragment of a main guide illustrating especially the structure which causes it to return to its normal tilted position as illustrated in Fig. 1; Figs. 12 and 13 are perspective views of fragments of two types of subguides useful in a sorter; Fig. 14 is a view representing the arrangement of a portion of index tabs of the main guides and subguides when the sorter of Fig. 1 is viewed from one end; Fig. 15 is a perspective view of a fragment of a guide with a modified form of tab and Fig. 16 is a sectional view thereof taken on the line 16—16 of Fig. 15; Fig. 17 illustrates the arrangement of a portion of the index tabs on the main guides and the subguides of the sorter of Fig. 1; Fig. 18 represents another possible arrangement of these index tabs for a numerical sorter; and Fig. 19 illustrates still another possible combination of index tabs on the main guides and subguides of an alphabetic sorter.

Referring especially to Figs. 1, 2 and 3, the sorter includes a rectangular frame formed of angle-iron in which the side pieces are designated 5, and the end pieces thereof are designated 6. The parts 5 and 6 of the frame may be fastened together in any suitable manner as by welding to provide a rigid base. As herein illustrated, this frame is mounted on a supporting structure including the legs 7, although it will be understood that this structure may be dispensed with and the frame may be supported directly on a table or counter. Within the frame there is mounted on the transverse channel strips 12, a rectangular tray 8 having vertical sides 9 which terminate in horizontal extensions 10 (Fig. 2). The channel strips 12 are preferably welded to the bottom of the tray as shown in Fig. 3 and are of sufficient length to have their ends rest on the lower flanges of the sides 5 of the frame. The ends of the tray are closed by the channel-shaped strips 11 which may be secured in the position shown in Fig. 3, by spot-welding the lower flanges thereof to the bottom of the tray. These strips as well as the end pieces 6 of the frame are slotted to support in correct spaced relation, the ends of the metal guide rods 15. An intermediate guide rest 13 is provided lengthwise of the tray and although it may be formed integrally with the body of the tray, it is preferred to make it of channel-iron to which clips 14 are attached as by spot-welding. These clips pass through slots in the tray bottom and are then bent over at right-angles to engage the underside of the tray.

At the front of the sorter an angular strip 16 of sheet-metal is spot-welded to the extension 10 of the front side 9 of the tray, so that the upper surface of the strip 16 is in substantially the same plane as the top surface of the guide rest 13 and the guide rods 15. This strip is fastened by screws such as 50 to the upright of the front side 5 of the frame. The screws 50 also serve as a mounting for the hinged support of the swinging leaf or shelf 52 which is held in its horizontal position by braces 53 engaging openings in the front legs 7. It will be understood that the shelf may be lowered to its folded vertical position by detaching these braces 53 from the openings in the legs. At the rear of the sorter there is likewise provided an angular piece of sheet material 17 which is in like manner spot-welded to the extension 10 of the rear side 9 of the tray, so that the upper surface of the piece 17 is also in substantially the same plane as the guide rest 13, and the guide rods 15. For convenience in using the sorter, an angular sheet-metal ledge 18 is mounted with its upper surface substantially flush with the upper surface of the piece 17 and is fastened to the body of the sorter by means, such as screws 19 passing through its lower flange, through the depending flange of the piece 17, and through the upright portion of the side piece 5 at the rear of the frame. The ledge 18 is preferably provided with the upright portion 20 which serves as a stop to prevent the sorted material being pushed out at the rear of the sorter. It should be noted that the upper flanges of strips 11 are spot-welded to the upper surfaces respectively of the angular strips 16, 17 and guide rest 13. At the ends of the sorter there are provided the steel plates 21 which are curved at their upper ends to provide handles 22 by which the sorter may be moved on its casters, if a supporting structure is employed or by which the tray may be lifted when the sorter is used on a table or counter if the supporting structure is omitted. The plates 21 also serve to close the slots in end pieces 6 of the frame, and thereby retain the guide rods in position since these plates are secured to the face of the angular members 6 of the frame by means of screws such as 23.

Before inserting the guide rods 15 and end plates 21, a series of guides are placed in the desired sequence in the tray. The guide rods 15 are then inserted to retain the guides and the assembly is completed by attaching the end plates 21 to the sorter. In many applications of the device it has been found desirable to employ two types of guides; sheet-metal main guides 24 Fig. 10 and fiber or pressboard subguides 29 and 34 (Figs. 12 and 13). At each of the lower corners of the main guide there is formed a lug 86 at right-angles to the body thereof which lugs engage the upper surface of the tray bottom so that the guide assumes a tilting position only in the one direction as indicated at the left-hand portion of Fig. 1. The upper rear corner of each main guide is provided with an index tab 27 which has a front face 28 at right-angles to the body of the guide and inclined to the front edge thereof to be easily read from the front of the sorter. The main guides are provided with slots 25 to receive guides 15 and with cutout portions to receive the guide rest 13. In addition to the main guides, there are provided the primary subguides 29 (Fig. 12) which are likewise formed of sheet material but are preferably made of some light material, such as pressboard or fiber. The lower portion of these guides are also provided with slots 25 to receive the guides 15 while the sorter is being assembled, and are also provided with cut-out portions 26 to receive the guide rest 13. On the upper edge of the primary subguides there are provided index tabs 32 having an inclined face 33 bearing a suitable letter or index character, which face likewise is inclined toward the front edge of the guide at an angle to be easily read from the front of the sorter. It will be understood that the index tabs 32 of the primary subguides are placed at various positions along the upper edge thereof to provide a grouping arrangement of index tabs according to an arrangement which will be hereinafter referred to.

In addition to the primary subguides 29, there are provided the secondary subguides 34 (Fig. 13) which likewise have slots 25 and cut-out portions 26, but they differ from the primary subguides in that they are equipped with index tabs 35 in which the portion of the tab bearing the index character is in a plane parallel with the main plane of the subguide.

It will be noted that the main guides and the subguides have openings 81 in alinement so that small sheets can be readily found in the sorter without opening up all of the guides, thereby preventing sorted material from being lost in the sorter.

Although the disclosed construction of the tray 8 with its guide rods 15 and guide rest 13 is a convenient way of mounting the various guides, it will be understood that various different types of structures may be used for this purpose. The present novel arrangement is designed particularly to maintain the following combination of features: A desirable and uniform angle of inclination when the guides are at rest, to provide free and ample opening of the guides to receive sorted material, and to provide unlimited and easy adjustment of spaces between guides within the limits of the tray length.

The uniform and desirable angle of inclination is obtained by restraining the angular movement of the bottom of the guide, which is accomplished by the relatively deep cross-section of the guide rod 15, the vertical dimension of which C, (Fig. 4) is somewhat less than the vertical dimension E of the corresponding slot 25 in the guides (Fig. 7). The difference between C and E determines the angle of inclination.

Unlimited and easy adjustment results from the condition that the guides are not restricted in their movement along the guide rods, although they are held approximately in place by friction during the sorting operation, but there is a tendency for them to creep providing a self-adjustment as the spaces between guides require expansion. Then, when a deliberate readjustment of spacing is desired, the guides can be readily moved in groups by hand to the desired location.

The free angular movement and ample opening between guides is accomplished by the combination of flexible guide rods, guide rest 13, and the space relation between these parts. By reference to Figs. 4 to 9 inclusive, which are diagrams useful in explaining the invention, the conditions which must prevail in order to have a free movement of the guides, are pointed out. It has been mentioned that the guides are carried on the somewhat flexible guide rods 15 having an upper surface designated Y and a lower surface designated W. The guide rod must be comparatively deep in vertical cross-section and this dimension which is designated C must be uniform throughout. It will be understood however, that various shapes of cross-sections may be used, such as solid, channel and the like, but a guide of channel shape is preferred on account of ease in manufacture and because of the desired flexibility which is possesses. The guide rod must also be so positioned above the surface Z of the bottom of the tray that the surface W of the guide rod is spaced therefrom a uniform distance B, and the surface Y of the guide rod is a uniform distance above the surface Z herein indicated as A′ (Fig. 5). It will be seen from Fig. 6 that the dimension E representing the height of the slots 25 in the guides is greater than the height C of the guide rod. The greater dimension E is than dimension C, the more the guide will tile. The distance F (Fig. 7) which is the distance from the bottom of the guide to the bottom of the slot must be slightly less than the dimension B (Fig. 4) which is the distance between the bottom W of the guide 15 and the upper surface Z of the bottom of the tray 8. The normal tilted position of the guide is indicated by G1 in Fig. 4, but when the guide is opened for insertion of sorted material, it swings on the upper edge A4 of its slot until its bottom C1 engages the bottom of the tray Z at C2. At this point, C2 becomes the fulcrum and the guide swings open to G3. There are two principal features to this movement: First, it has been found that the motion is easiest when adjacent guides are displaced horizontally as little as possible. Such horizontal displacement is not likely to exceed the distance C1 C2 according to the positions of the guide as indicated in Fig. 4. This distance is reduced to a minimum by maintaining guide dimension F nearly equal to dimension B, and it is otherwise controlled by the relation between angle of inclination and depth C of guide rod 15. Second, it is also desirable to open up an ample clearance equivalent to A3 A4 between the adjacent guides so that sorted material can be readily placed on its supporting plane Y. This is accomplished by having the guide pivot below this plane at a lower plane Z. The clearance A3 A4 closes up when the guide drops back to approximately its original tilted position G1.

If the supporting tray were short and if the guide rods were straight and rigid, the guide rest and other special features of construction would not be required, but where the sorting tray is of large capacity, for example, about forty inches long as in the device shown in Fig. 1, it would be necessary for the guide rods to support about thirty pounds of guides plus the weight of the paper or sheets distributed between them. Thus, it would be difficult to maintain a uniform dimension B (Fig. 4) throughout the length of the tray, unless other expedients were resorted to. It has been mentioned that in the bottom of the tray, there is provided a guide rest 13 having the upper surface X which serves to support the lower edge of the guide at its cutout portion 26 when the guide is in its inclined position of rest. It has been mentioned that the surface X of the guide rest is spaced above the upper surface Z of the tray bottom at a distance A2 and it is desired to maintain the dimension A′, which is the distance between the top surface Y of the guide rod 15 and the surface Z of the tray equal to A2, since A2 can be kept quite uniform. If the guide rod is somewhat flexible as herein proposed and is supported in accurate spaced relation at its ends with respect to the surface Z of the tray, the distance A1 will be about equal to A2 due to the supporting reactions of the guides as illustrated in Figs. 6, 6a, 8 and 9. In Fig. 4 there is illustrated the normal position of the guide with respect to the various supporting parts such as the guide rest and the guide rods when the guide is tipped back to position G1 or raised to the position G3, as indicated in dotted lines, for the insertion of papers.

If, for any reason the guide rod should be depressed below the guide rest abnormally due to distortion of guide rod or guide rest, a condition will result illustrated by Fig. 8 in which the guide bears on the surface X of the guide rest and is bearing upward on the guide rod at its lower surface W, since the upper surface of the guide rod is depressed below the surface X of the guide rest a distance equal to G. When the guide is tilted back to its normal position, the lower edge of its slot 25 tends to rise, creating an upward pressure on the lower surface of the guide rod which will raise this rod to its normal position. Since there will be a relatively large number of the guides tending to raise the rod in this manner, a very little pressure on the part of each guide is required to make the guide rod assume its desired relative position.

In the diagram of Fig. 9 there is illustrated the reactions which will exist in the event that the guide rod was distorted above the surface X of the guide rest a distance equal to H. In this case the inclined guide would be bearing on the guide rod at both its upper surface Y and its lower surface W, since in this instance the guide rod would solely support the guide in its inclined position. However, the pressure of the guide on the upper surface Y of the guide rod would exceed the pressure at its lower surface W by an amount equal to the weight of the guide. The weight of all the guides will depress the guide rod to the level of the surface X of the guide rest where further displacement is checked since the guide rest will then assume the main weight of the guides.

It has been mentioned that the main guides and the primary subguides have indexing tabs with inclined surfaces each of which can bear an index character in such position that it is visible from the front edge of the guides. It has also been mentioned that the secondary subguides have an index tab with its surface in the plane of the guide. The secondary tabs do not require labelling as an essential to operation of the sorter, but it has been found convenient to label them to facilitate identification of guides in stock and to accustom an inexperienced sorter operator to their relative locations.

In accordance with one feature of the present invention, the index tabs on the main guides and subguides are arranged, as shown in Figs. 17, 18, and 19, according to a system of rectangular coordinates, by which is meant, that the tabs on the main guides are positioned in a row along one axis of the sorter preferably the long axis thereof, whereas, the index tabs on the primary and secondary subguides are positioned in staggered relation generally along axes at right-angles to that of the main guides, in this instance, transversely of the sorter. Thus, when a clerk is classifying a piece of correspondence or a card by the use of the sorter, the selection of the group defined by the main guide is made along one axis of the sorter, in this case the long axis and the subgroup of this group is selected along the other axis of the sorter, in this instance, the transverse axis. It will be noted that two types of index tabs are used on the subguides, in one type the index character being visible from the edge of the subguide and in the other type, being visible only from the face of the guide. While the invention is not confined to this arrangement, such a combination of coordinate indexing together with the two types of tabs has been found particularly convenient, because the interval between these tabs, in the quantities desired, is too limited to allow space for an exceedingly legible character on all tabs and the mere locations of the nonlegible tabs with relation to the nearby legible tabs provide ample means for identification, in which the sorting clerk soon becomes proficient.

In Fig. 17, a proposed arrangement of guides is shown for sorting material in groups of two letters. In this case the main guides (designated by capital letters), mark the first letters; whereas the following letter is marked by the subguides, (designated by lower case letters). For example, tab 60 represents the combination C*h*. The primary subguides are selected as the letters most commonly used and to provide convenient separation. Some secondary subguides have been omitted being combinations which rarely or never appear in proper names, such as B*x*, C*s*, W*v*, etc. Q never appears without "*u*" and "X" is exceedingly limited thereby making it possible to employ one guide only for these letters. Thus material can be sorted by two letter groups in a series of about 500 guides.

Fig. 18 shows an arrangement for numerical sorting, the beginning and end of a thousand guide series being shown. The hundreds are indicated by specially colored main guide tabs (every fifth main guide), the tens are divided between remaining main guides (even tens) and intermediate subguides (odd tens). The blank tabs on subguides indicate the fives. The remaining digits are the secondary subguides. Thus the guide for "953" is represented at 61.

Fig. 19 shows an abbreviated alphabetic arrangement in which the first of two letters is represented by one of the main or primary subguides. The second letter to the nearest preceding vowel is represented by a secondary subguide. For example the letters E*m* would be sorted behind guide 62. The subguides "*a*" are not included since, in this case, the material is sorted between the primary guide and following subguide.

In certain applications of the invention, such as, in a mail sorting device, it is preferred to substitute the modified tab arrangement illustrated in Figs. 15 and 16 for those disclosed in the foregoing description. Otherwise, the construction and operation of the sorting device remains the same as previously set forth. In this embodiment of the invention, each guide 24 is provided at its upper front cut-off corner with a sheet metal tab 80 of a common type employing an inserted label. These tabs are inclined to the edges and surfaces of the guides so that they can assume a nested arrangement and still remain at least partially legible from the front edges of the guides. The label employed in these tabs is preferably lettered in vertical sequence. This arrangement while particularly adapted for mail sorting, is useful for other purposes to which the coordinate system of indexing cannot be easily applied.

It will be understood that the present disclosure is merely typical of applicant's invention and there may be many modifications and variations thereof within the scope of the appended claims without departing from the spirit of this invention. It will be further understood that the invention is not limited merely to use in sorting material, but is equally useful for filing, storing and related purposes.

What I claim is—

1. In a device of the class described, a support, a plurality of guides mounted to extend in an upward direction and independently movable so that their tops may be separated, and index tabs provided on certain of said guides, each tab being inclined to the vertical and having its principal plane at right angles to the principal plane of the respective guide.

2. In a device of the class described, a support, a plurality of guides swingingly mounted in said support to define compartments open at one common side, and index tabs provided on the upper edges of certain of said guides at a point above the top edges of material to be placed in said compartments, the principal planes of said tabs being inclined from the vertical and facing the front edges of the guides.

3. In a device of the class described, a support, a plurality of guides swingingly mounted in said support, index tabs provided on the top edges of certain of said guides, the principal planes of said tabs being inclined from the vertical and facing a front edge of the respective guides, each of certain others of said guides being provided with an index tab in a plane parallel to the principal plane of its guide.

4. In a device of the class described, a support, a plurality of guides swingingly mounted in said support to define compartments open at the top edges and at one of their common sides, and index tabs provided on the top edges of certain of said guides, the labelled surfaces of each tab being at an oblique angle with respect to both the top and side edges of the respective guide.

5. In a device of the class described, a support, a plurality of guides arranged in a row and mounted adjacent their lower edges in said support, and index tabs on the upper edges of said guides, said tabs being arranged generally in longitudinal and transverse rows and having the principal planes of the reading faces thereof inclined from the vertical and facing a common front edge of said guides.

6. In a device of the class described, a support, a plurality of guides swingingly mounted adjacent their lower edges in said support, and under tabs on the upper edges of said guides, the principal planes of the reading faces of certain of said tabs being inclined from the vertical and facing the front edge of said guides, and the reading faces of certain others of said tabs being in planes parallel to the principal planes of said guides.

7. In a device of the class described, a support, a guide rod and a guide rest mounted therein, guides having portions to engage said guide rod and said guide rest whereby said guides are swingingly mounted generally at their lower portions, an index tab provided on the upper edge of each guide, said index tabs of the respective guides being arranged generally in longitudinal and transverse rows, a group of said tabs having index surfaces facing generally in the same direction and a second group of said tabs each having an index surface generally at right angles to the surfaces of the tabs of the other group.

8. In a device of the class described, a support, a somewhat flexible guide rod and a rigid guide rest mounted in said support, and a plurality of guides mounted for swinging movement on said guide rod and said guide rest, portions of said guides in their positions of rest engaging the upper surface of the guide rest and the lower surface of the guide rod, said guides being provided with means engaging said support to establish the direction of inclination of said guides.

9. In a device of the class described, a support, a plurality of somewhat flexible guide rods and a rigid guide rest mounted in said support, and a plurality of guides mounted for swinging movement on said guide rods and said guide rest, portions of said guides in their positions of rest engaging the upper surface of the guide rest as well as both the upper surfaces and the lower surfaces of the guide rods.

10. In a device of the class described, a support, at least one somewhat flexible guide rod and a guide rest mounted in said support, guides swingingly mounted on said guide rod and having portions to engage the lower side of said guide rod, said guides cooperating with said guide rest and said guide rod to maintain the upper surface of the guide rod in a common plane with the upper surface of the guide rest even when a substantial number of guides are raised from an inclined position.

11. In a device of the class described, a support, somewhat flexible guide rods and a guide rest mounted in said support with their upper surfaces in substantially the same plane, guides swingingly mounted on said guide rods, said guides engaging the upper surface of the guide rest and the lower surface of the guide rods to maintain the upper surface of the guide rods in substantially the same plane with the upper surface of the guide rest.

12. In a sorting device, a frame, somewhat flexible guide rods and a guide rest mounted in said frame, guides swingingly mounted on said guide rods and having portions engaging the lower side of said rods, said guides cooperating with the guide rest and the guide rods to maintain the upper surface of the guide rods and the upper surface of the guide rest in a common plane.

13. In a device of the class described, a tray having ends provided with slots, guide rods supported in said slots, a guide rest mounted in operative relation to said guide rods, detachable end plates secured to said tray and covering the ends of said slots whereby said guide rods are retained in position, and guides swingingly mounted on said guide rods, said guides cooperating with said guide rods and guide rest to maintan said guides in an upwardly extending position.

14. In a device of the class described, a support, guide rods and a guide rest mounted on said support with their upper surfaces in substantially the same plane, and guides mounted on said guide rods and guide rest, said guides engaging said guide rods to swing thereon when being moved angularly toward a vertical position, said guides thereafter engaging a surface of said support below said guide rods and guide rest, in the continued movement of the guides to swing thereon.

15. In a device of the class described, a support, a plurality of guides movable to a position to separate and support sorted material, means in said support on which each of said guides is rotatable during a portion of its range of movement, and other means in said support on which each of said guides is rotatable during another portion of its range of movement, said means being in two different planes, one of said planes being substantially in the plane of the lower edge of the sorted material and the other plane being substantially below said edge of said sorted material.

16. In a device of the class described, a support, a plurality of somewhat flexible guide rods and a guide rest fixed in said support, said guide rods having a substantially greater depth than width, and a plurality of guides mounted for swinging movement on said guide rods and said guide rests, portions of said guides in their positions of rest engaging the upper surface of the guide rest as well as both the upper surfaces and the lower surfaces of the guide rods.

17. In a device of the class described, supporting means including guide rest means having downwardly extending sides and a horizontal guide rod extending along each of said sides of said guide rest means, a plurality of guides mounted for swinging movement on said guide rods, and means on said guides engaging said supporting means, for normally limiting the inclination of said guides to one general direction.

18. In a device of the class described, supporting means including a raised guide rest and a horizontal guide rod at each side of said guide rest and parallel thereto, a plurality of guides mounted for swinging movement on said guide rods, sub-guides having openings therein to receive said guide rest and thru which said guide rods pass whereby said subguides are free to swing on said guide rods, and means on said guides engaging said supporting means to limit their inclination to one general directon.

EDWIN S. ROSCOE.